(12) United States Patent
Sohn et al.

(10) Patent No.: US 10,589,719 B1
(45) Date of Patent: Mar. 17, 2020

(54) METHOD FOR MANAGING DIGITAL KEY OF MOBILE DEVICE FOR VEHICLE-SHARING AND KEY SERVER USING THE SAME

(71) Applicants: Hyundai Autoever, Seoul (KR); Hyundai AutoEver Telematics America, Inc., Fountain Valley, CA (US)

(72) Inventors: Changki Sohn, Gyeonggi-do (KR); Bongseok Kim, Irvine, CA (US)

(73) Assignees: Hyundai Autoever, Seoul (KR); Hyundai AutoEver Telematics America, Inc., Fountain Valley, CA (US)

( * ) Notice: Subject to any disclaimer, the term of this patent is extended or adjusted under 35 U.S.C. 154(b) by 0 days.

(21) Appl. No.: 16/426,342

(22) Filed: May 30, 2019

(51) Int. Cl.
*B60R 25/24* (2013.01)
*G07C 9/00* (2020.01)

(52) U.S. Cl.
CPC ........ *B60R 25/241* (2013.01); *G07C 9/00015* (2013.01); *G07C 9/00119* (2013.01)

(58) Field of Classification Search
CPC .............. B60R 25/241; G07C 9/00015; G07C 9/00119
See application file for complete search history.

(56) References Cited

U.S. PATENT DOCUMENTS 9,365,188 B1 * 6/2016 Penilla ................... B60L 53/14
2018/0357846 A1 * 12/2018 Chen .................. G07C 9/00309

\* cited by examiner

*Primary Examiner* — James J Yang
(74) *Attorney, Agent, or Firm* — Husch Blackwell LLP (57) ABSTRACT

A method for managing a digital key of a mobile device for vehicle-sharing is provided. The method includes steps of: a key server, (a) if a registration request is acquired from an owner mobile device of an owner of the vehicle, generating a primary key and a secondary key, primary rights and secondary rights, combining the primary rights with the primary key and the secondary rights with the secondary key, transmitting the primary key and the secondary key to the owner mobile device, and setting the vehicle and the owner mobile device as a domain of the vehicle; and (b) if a vehicle-sharing request is acquired from the owner mobile device or a vehicle-sharing server, generating vehicle-sharing rights, combining the vehicle-sharing rights with the secondary key, transmitting each combined vehicle-sharing right to its corresponding information-receiving means of the vehicle-sharing users, and registering the user mobile devices in the domain.

20 Claims, 5 Drawing Sheets

METHOD FOR MANAGING DIGITAL KEY OF MOBILE DEVICE FOR VEHICLE-SHARING AND KEY SERVER USING THE SAME

FIELD OF THE DISCLOSURE

The present disclosure relates to a method for managing a digital key of a mobile device for vehicle-sharing; and more particularly, to the method for managing the digital key for sharing a vehicle controlled by the digital key stored in the mobile device and a key server using the same.

BACKGROUND OF THE DISCLOSURE

Generally, a smart key, also referred to as a key fob, of a vehicle is a device that allows a user, i.e., a driver, to open and close a door and start the vehicle without inserting a separate key or operating buttons.

The user can start the vehicle only with the smart key, however, in the case of a connected car, the vehicle is started remotely through a telematics service, and the user enters the vehicle and switch it to a general starting mode.

Meanwhile, as research on the connected car has been increasing, a smart-key-free starting method has been developed in which the user directly starts the vehicle using his/her smart phone, i.e., a mobile device, without the smart key.

Accordingly, a connected car service provides a service using digital key technology, for opening the doors or starting the vehicle through the mobile device using NFC (Near Field Communication)/BLE (Bluetooth Low Energy), and the technology is widely used in common door locks and remote control applications.

Particularly, in a method using digital keys based on the mobile device, since the vehicle is directly connected to the mobile device without communicating with a server over a telecommunications network, the vehicle can be operated without any problem even in an out-of-service area, and since no telecommunication service is used, no additional cost is required.

In addition, since the digital keys based on the mobile device can be shared, a person who has access to the shared digital keys based on the mobile device can use the vehicle without an additional procedure.

Herein, in vehicle-sharing according to sharing of the digital keys based on the mobile device, various restrictions may be imposed. For example, the restrictions may be that the vehicle can only be used for 3 hours, or only the trunk can be open.

However, since a replay attack, which uses random digital keys of the mobile device, on the vehicles not connected to the Internet is possible, there is a risk of theft of the vehicles which uses the digital keys based on conventional mobile communication.

In addition, conventionally, the digital keys based on the mobile device can be generated indefinitely without regard to an actual key, which makes it difficult to manage the digital keys. That is, as the number of the digital keys generated for a single vehicle increases, the management of the digital keys becomes more difficult.

In addition, when the digital keys based on the mobile device are provided as encrypted SMSs for vehicle-sharing, the encrypted SMSs can be decrypted by another person, thus illegal use of the digital keys is difficult to prevent.

Conventionally, in order to share a vehicle, a user has to continuously delete and newly receive digital keys, and when the vehicles of different manufacturers are shared, the user has a limit in using an app on the mobile device, or the user must use a plurality of apps corresponding to the different manufacturers.

In addition, conventionally, there is a difficulty in managing the digital keys due to a compatibility of an app store update and an operation system of the mobile device which has a registered digital key for vehicle-sharing.

In addition, even when a conventional vehicle-sharing service using a digital key based on a mobile device is provided, a large amount of resources are required to perform management of a start and a termination of the vehicle-sharing, user management for vehicle-sharing, and billing management, etc.

SUMMARY OF THE DISCLOSURE

It is an object of the present disclosure to solve all the aforementioned problems.

It is another object of the present disclosure to allow an already generated digital key to be shared and used without generating an additional digital key for vehicle-sharing.

It is still another object of the present disclosure to prevent an illegal use of a vehicle caused by a leakage of a digital key for vehicle-sharing based on a mobile device.

It is still yet another object of the present disclosure to allow the vehicle to be shared by a user using the digital key received for the vehicle-sharing.

It is still yet another object of the present disclosure to allow the digital key based on the mobile device to be used without regard to a compatibility of an app store update and an operation system of the mobile device.

It is still yet another object of the present disclosure to allow easy management of history of the vehicle-sharing based on usage information on the digital key based on the mobile device for sharing the vehicle by multiple users.

In accordance with one aspect of the present disclosure, there is provided a method for managing at least one digital key of at least one mobile device to be used for vehicle-sharing, including steps of: (a) a key server, if a registration request for registration of a vehicle, including vehicle information and owner information, is acquired from an owner mobile device of an owner of the vehicle, (i) generating a primary key and a secondary key to be used for controlling the vehicle, (ii) generating primary rights, including a range of control over the vehicle by the primary key and generating secondary rights, including a range of control over the vehicle by the secondary key, (iii) combining the primary rights with the primary key and combining the secondary rights with the secondary key, (iv) transmitting the primary key combined with the primary rights and the secondary key combined with the secondary rights to the owner mobile device, and (v) setting the vehicle and the owner mobile device as a domain of the vehicle; and (b) the key server, if a vehicle-sharing request including (i) at least one of the owner information, the primary key, the secondary key, the primary rights, and the secondary rights, (ii) information on a 1-st to an n-th vehicle-sharing users who have requested vehicle-sharing, including (ii-1) identification information on the 1-st to the n-th vehicle-sharing users, (ii-2) information on a 1-st to an n-th user mobile devices of the 1-st to the n-th vehicle-sharing users, and (ii-3) information on information-receiving means of the 1-st to the n-th vehicle-sharing users, and (iii) a 1-st to an n-th pieces of vehicle-sharing configuration information respectively corresponding to the 1-st to the n-th vehicle-sharing users wherein each piece of the vehicle-sharing configuration information includes information on a range of control by each of the vehicle-sharing users over the vehicle, is acquired from the owner mobile device or a vehicle-sharing server, (1) generating a 1-st to an n-th vehicle-sharing rights, including ranges of control over the vehicle by the secondary key, corresponding to each of the 1-st to the n-th vehicle-sharing users by referring to the 1-st to the n-th pieces of the vehicle-sharing configuration information, (2) combining each of the 1-st to the n-th vehicle-sharing rights with the secondary key, to thereby transmit each of the combined 1-st to the n-th vehicle-sharing rights to its corresponding information-receiving means of the 1-st to the n-th vehicle-sharing users, and (3) registering the 1-st to the n-th user mobile devices in the domain.

As one example, the method further comprises a step of: (c) the key server, if a usage request for using the secondary key to control the vehicle is acquired from a specific user mobile device among the 1-st to the n-th user mobile devices registered in the domain, (i) verifying specific vehicle-sharing rights included in the usage request, (ii) transmitting, if the specific vehicle-sharing rights are determined as valid, a permission to use the secondary key to the specific user mobile device, to thereby allow the specific user mobile device to control the vehicle according to the specific vehicle-sharing rights by using the secondary key, (iii) billing, if vehicle-sharing of the vehicle using the specific user mobile device is terminated, for the vehicle-sharing, and (iv) registering information on a time and a place of termination of the vehicle-sharing using the specific user mobile device, in the domain by referring to location information on the specific user mobile device, to thereby allow the owner and another vehicle-sharing user to access the place and a vehicle-sharing status of the vehicle.

As one example, the method further comprises a step of: (d) the key server, if one or more transactions for controlling the vehicle using the secondary key are acquired from a specific user mobile device among the 1-st to the n-th user mobile devices registered in the domain, managing usage information on the secondary key by referring to the transactions, and confirming whether the control over the vehicle according to the transactions is within a range of specific vehicle-sharing rights provided to a specific vehicle-sharing user corresponding to the specific user mobile device.

As one example, after the step of (a), the method further comprises a step of: (e) the key server, (i) if a change request for the primary key and the secondary key is acquired from a new owner mobile device of a new owner according to change of an ownership of the vehicle, transmitting a confirmation request corresponding to the change request to the owner mobile device, to thereby allow the owner to confirm whether the change request is valid, and (ii) if the confirmation of the change request is acquired from the owner mobile device, (ii-1) revoking the primary rights and the secondary rights respectively corresponding to the primary key and the secondary key, (ii-2) generating new primary rights including a range of control over the vehicle by the primary key and generating new secondary rights including a range of control over the vehicle by the secondary key, (ii-3) combining the new primary rights with the primary key and combining the new secondary rights with the secondary key, (ii-4) transmitting the primary key combined with the new primary rights and the secondary key combined with the new secondary rights to the new owner mobile device, and (ii-5) registering the new owner mobile device in the domain and removing the owner mobile device registered in the domain.

As one example, the method further comprises a step of: (f) the key server (i) confirming the 1-st to the n-th vehicle-sharing rights by communicating with the 1-st to the n-th user mobile devices, to thereby allow at least part of the vehicle-sharing rights to expire whose effective dates are lapsed, or verifying the 1-st to the n-th vehicle-sharing rights, to thereby allow at least part of the 1-st to the n-th vehicle-sharing rights to expire which are determined as forged, and (ii) recording information on the expired vehicle-sharing rights as corresponding to information on the secondary key.

As one example, at the step of (b), the key server confirms whether history of sharing the vehicle by the 1-st to the n-th vehicle-sharing users is present by referring to the domain in response to the vehicle-sharing request, and transmits only specific vehicle-sharing rights to the information-receiving means of a specific vehicle-sharing user among the 1-st to the n-th vehicle-sharing users without combining the specific vehicle-sharing rights with the secondary key related to the specific vehicle-sharing user who has the history of sharing the vehicle.

As one example, after the step of (a), the method further comprises a step of: (g) the key server, if a re-issuance request for the primary key and the secondary key is acquired from the owner, (i) verifying whether the owner is a real owner of the vehicle, (ii) revoking the primary key, the primary rights, and the secondary rights generated at the step of (a), (iii) generating a changed primary key to be used for controlling the vehicle, (iv) generating changed primary rights including a range of control over the vehicle by the changed primary key and generating changed secondary rights including a range of control over the vehicle by the secondary key, (v) combining the changed primary rights with the changed primary key and combining the changed secondary rights with the secondary key, and (vi) transmitting the changed primary key combined with the changed primary rights and the secondary key combined with the changed secondary rights to the information-receiving means of the owner.

As one example, after the step of (a), the method further comprises a step of: (h) the key server, if a re-issuance request for the primary key and the secondary key is acquired from the owner, (i) verifying whether the owner is a real owner of the vehicle, (ii) revoking the primary rights and the secondary rights generated at the step of (a), (iii) generating changed primary rights including a range of control over the vehicle by the primary key and generating changed secondary rights including a range of control over the vehicle by the secondary key, (iv) combining the changed primary rights with the primary key and combining the changed secondary rights with the secondary key, and (v) transmitting the primary key combined with the changed primary rights and the secondary key combined with the changed secondary rights to the information-receiving means of the owner.

As one example, the primary rights, the secondary rights, and the 1-st to the n-th vehicle-sharing rights respectively include a signature value of the key server.

As one example, the primary rights, the secondary rights, and the 1-st to the n-th vehicle-sharing rights are respectively certificates corresponding to an online certificate status protocol (OCSP).

In accordance with another aspect of the present disclosure, there is provided a key server for managing at least one digital key of at least one mobile device to be used for vehicle-sharing, including: at least one memory that stores instructions; and at least one processor configured to execute the instructions to perform or support another device to perform processes of: (I) if a registration request for registration of a vehicle, including vehicle information and owner information, is acquired from an owner mobile device of an owner of the vehicle, (i) generating a primary key and a secondary key to be used for controlling the vehicle, (ii) generating primary rights, including a range of control over the vehicle by the primary key and generating secondary rights, including a range of control over the vehicle by the secondary key, (iii) combining the primary rights with the primary key and combining the secondary rights with the secondary key, (iv) transmitting the primary key combined with the primary rights and the secondary key combined with the secondary rights to the owner mobile device, and (v) setting the vehicle and the owner mobile device as a domain of the vehicle, and (II) if a vehicle-sharing request including (i) at least one of the owner information, the primary key, the secondary key, the primary rights, and the secondary rights, (ii) information on a 1-st to an n-th vehicle-sharing users who have requested vehicle-sharing, including (ii-1) identification information on the 1-st to the n-th vehicle-sharing users, (ii-2) information on a 1-st to an n-th user mobile devices of the 1-st to the n-th vehicle-sharing users, and (ii-3) information on information-receiving means of the 1-st to the n-th vehicle-sharing users, and (iii) a 1-st to an n-th pieces of vehicle-sharing configuration information respectively corresponding to the 1-st to the n-th vehicle-sharing users wherein each piece of the vehicle-sharing configuration information includes information on a range of control by each of the vehicle-sharing users over the vehicle, is acquired from the owner mobile device or a vehicle-sharing server, (1) generating a 1-st to an n-th vehicle-sharing rights, including ranges of control over the vehicle by the secondary key, corresponding to each of the 1-st to the n-th vehicle-sharing users by referring to the 1-st to the n-th pieces of the vehicle-sharing configuration information, (2) combining each of the 1-st to the n-th vehicle-sharing rights with the secondary key, to thereby transmit each of the combined 1-st to the n-th vehicle-sharing rights to its corresponding information-receiving means of the 1-st to the n-th vehicle-sharing users, and (3) registering the 1-st to the n-th user mobile devices in the domain.

As one example, the processor further performs a process of: (III) if a usage request for using the secondary key to control the vehicle is acquired from a specific user mobile device among the 1-st to the n-th user mobile devices registered in the domain, (i) verifying specific vehicle-sharing rights included in the usage request, (ii) transmitting, if the specific vehicle-sharing rights are determined as valid, a permission to use the secondary key to the specific user mobile device, to thereby allow the specific user mobile device to control the vehicle according to the specific vehicle-sharing rights by using the secondary key, (iii) billing, if vehicle-sharing of the vehicle using the specific user mobile device is terminated, for the vehicle-sharing, and (iv) registering information on a time and a place of termination of the vehicle-sharing using the specific user mobile device, in the domain by referring to location information on the specific user mobile device, to thereby allow the owner and another vehicle-sharing user to access the place and a vehicle-sharing status of the vehicle.

As one example, the processor further performs a process of: (IV) if one or more transactions for controlling the vehicle using the secondary key are acquired from a specific user mobile device among the 1-st to the n-th user mobile devices registered in the domain, managing usage information on the secondary key by referring to the transactions, and confirming whether the control over the vehicle according to the transactions is within a range of specific vehicle-sharing rights provided to a specific vehicle-sharing user corresponding to the specific user mobile device.

As one example, after the process of (I), the processor further performs a process of: (V) (i) if a change request for the primary key and the secondary key is acquired from a new owner mobile device of a new owner according to change of an ownership of the vehicle, transmitting a confirmation request corresponding to the change request to the owner mobile device, to thereby allow the owner to confirm whether the change request is valid, and (ii) if the confirmation of the change request is acquired from the owner mobile device, (ii-1) revoking the primary rights and the secondary rights respectively corresponding to the primary key and the secondary key, (ii-2) generating new primary rights including a range of control over the vehicle by the primary key and generating new secondary rights including a range of control over the vehicle by the secondary key, (ii-3) combining the new primary rights with the primary key and combining the new secondary rights with the secondary key, (ii-4) transmitting the primary key combined with the new primary rights and the secondary key combined with the new secondary rights to the new owner mobile device, and (ii-5) registering the new owner mobile device in the domain and removing the owner mobile device registered in the domain.

As one example, the processor further performs a process of: (VI) (i) confirming the 1-st to the n-th vehicle-sharing rights by communicating with the 1-st to the n-th user mobile devices, to thereby allow at least part of the vehicle-sharing rights to expire whose effective dates are lapsed, or verifying the 1-st to the n-th vehicle-sharing rights, to thereby allow at least part of the 1-st to the n-th vehicle-sharing rights to expire which are determined as forged, and (ii) recording information on the expired vehicle-sharing rights as corresponding to information on the secondary key.

As one example, at the process of (II), the processor confirms whether history of sharing the vehicle by the 1-st to the n-th vehicle-sharing users is present by referring to the domain in response to the vehicle-sharing request, and transmits only specific vehicle-sharing rights to the information-receiving means of a specific vehicle-sharing user among the 1-st to the n-th vehicle-sharing users without combining the specific vehicle-sharing rights with the secondary key related to the specific vehicle-sharing user who has the history of sharing the vehicle.

As one example, after the process of (I), the processor further performs a process of: (VII) if a re-issuance request for the primary key and the secondary key is acquired from the owner, (i) verifying whether the owner is a real owner of the vehicle, (ii) revoking the primary key, the primary rights, and the secondary rights generated at the process of (I), (iii) generating a changed primary key to be used for controlling the vehicle, (iv) generating changed primary rights including a range of control over the vehicle by the changed primary key and generating changed secondary rights including a range of control over the vehicle by the secondary key, (v) combining the changed primary rights with the changed primary key and combining the changed secondary rights with the secondary key, and (vi) transmitting the changed primary key combined with the changed primary rights and the secondary key combined with the changed secondary rights to the information-receiving means of the owner.

As one example, after the process of (I), the processor further performs a process of: (VIII) if a re-issuance request for the primary key and the secondary key is acquired from the owner, (i) verifying whether the owner is a real owner of the vehicle, (ii) revoking the primary rights and the secondary rights generated at the process of (I), (iii) generating changed primary rights including a range of control over the vehicle by the primary key and generating changed secondary rights including a range of control over the vehicle by the secondary key, (iv) combining the changed primary rights with the primary key and combining the changed secondary rights with the secondary key, and (v) transmitting the primary key combined with the changed primary rights and the secondary key combined with the changed secondary rights to the information-receiving means of the owner.

As one example, the primary rights, the secondary rights, and the 1-st to the n-th vehicle-sharing rights respectively include a signature value of the key server.

As one example, the primary rights, the secondary rights, and the 1-st to the n-th vehicle-sharing rights are respectively certificates corresponding to an online certificate status protocol (OCSP).

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several aspects.

To allow those skilled in the art to carry out the present disclosure easily, the example embodiments of the present disclosure will be explained by referring to attached diagrams in detail as shown below.

Figure 1:
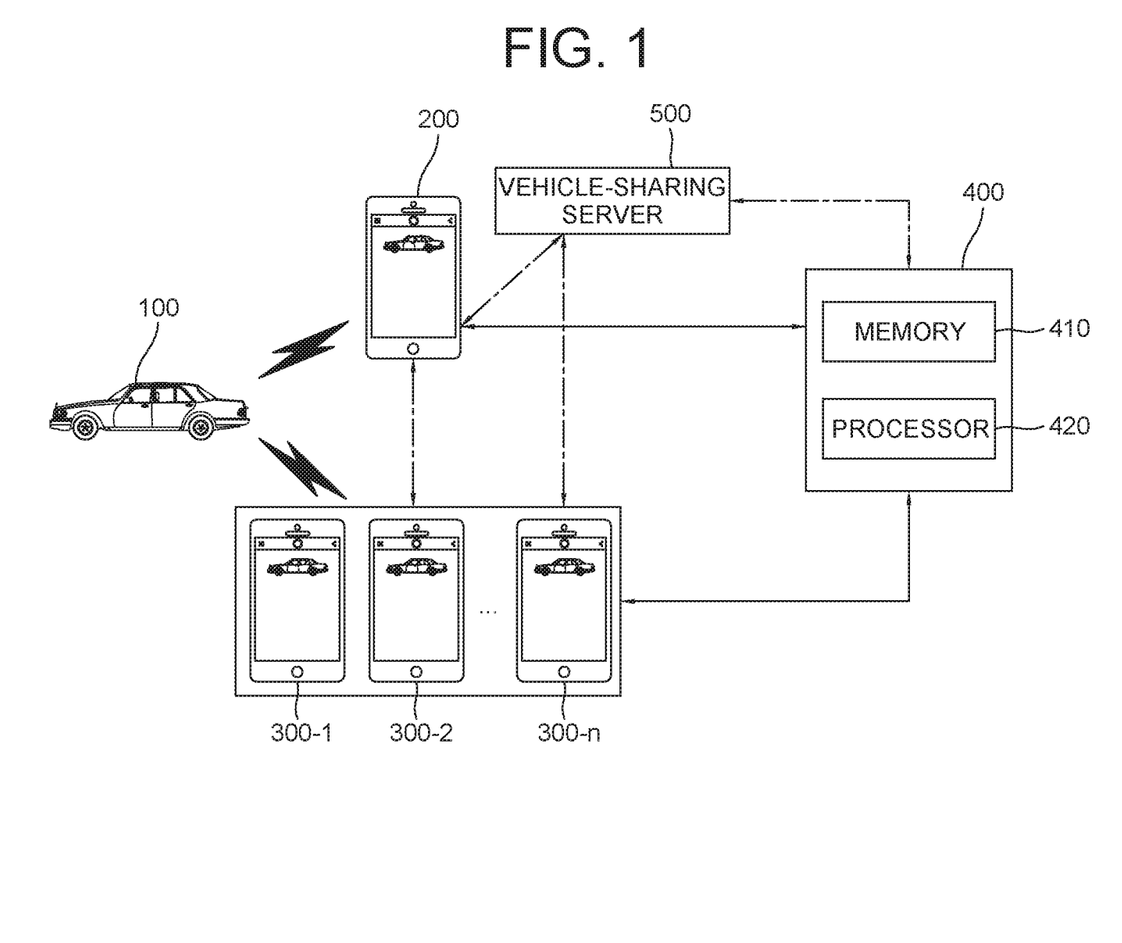
FIG. 1 is a drawing schematically illustrating a system for managing a digital key based on a mobile device for vehicle-sharing in accordance with one example embodiment of the present disclosure.

FIG. 1 is a drawing schematically illustrating a system for managing a digital key based on a mobile device for vehicle-sharing in accordance with one example embodiment of the present disclosure, and the system may include an owner mobile device 200, user mobile devices 300-1, 300-2, . . . , and 300-n, and a key server 400. In addition, the system may include a vehicle-sharing server 500.

First, the owner mobile device 200 may correspond to an owner of a vehicle 100, may allow the owner to control the vehicle 100 by using an acquired digital key, and may provide a user interface for the vehicle-sharing. Herein, the vehicle 100 may be at least one of a car, a bike, a bicycle, an airplane, etc., but it is not limited thereto. And, the owner mobile device 200 may allow the owner to perform operations related to the vehicle-sharing by way of an app installed on the owner mobile device 200. Herein, the owner mobile device 200 may include a lap-top PC, a tablet, a PDA, a smart phone, a mobile terminal device, etc., but the scope of the present disclosure is not limited thereto, and may include any computing devices capable of displaying, for the owner, information received via communication with other devices and transmitting a data signal corresponding to an input signal of the owner to other devices. Also, the owner mobile device 200 may store the acquired digital key for controlling the vehicle in a Secure Element (SE).

Next, the user mobile devices 300-1, 300-2, . . . , and 300-n may respectively correspond to users who share the vehicle 100 of the owner, may allow the users to control the vehicle 100 by using the acquired digital key, and may provide the user interface for the vehicle-sharing. And, the user mobile devices 300-1, 300-2, . . . , and 300-n may allow the users to perform the operations related to the vehicle-sharing by way of the app installed on the user mobile devices 300-1, 300-2, . . . , and 300-n. Herein, the user mobile devices 300-1, 300-2, . . . , and 300-n may include lap-top PCs, tablets, PDAs, smart phones, mobile terminal devices, etc., but the scope of the present disclosure is not limited thereto, and may include any computing devices capable of displaying, for the users, information received via communication with other devices and transmitting a data signal corresponding to an input signal of the users to other devices. Also, the user mobile devices 300-1, 300-2, . . . , and 300-n may store the acquired digital key for controlling the vehicle in the Secure Element (SE).

Next, the key server 400 may manage the digital key based on the mobile devices for the vehicle-sharing, and may include a memory 410 for storing instructions to manage the digital key based on the mobile devices for the vehicle-sharing, and a processor 420 for performing processes to manage the digital key based on the mobile device for the vehicle-sharing, corresponding to the instructions in the memory 410.

Herein, in response to a registration request for registration of the vehicle 100 acquired from the owner mobile device 200 of the owner of the vehicle 100, the key server 400 may generate a primary key and a secondary key to be used as digital keys for controlling the vehicle 100, may generate primary rights, i.e., a permission to use the primary key, and generate secondary rights, i.e., a permission to use the secondary key, and may combine the primary rights with the primary key and combine the secondary rights with the secondary key, to thereby transmit the primary key combined with the primary rights and the secondary key combined with the secondary rights to the owner mobile device 200. Also, in response to a vehicle-sharing request from the owner mobile device 200 using the secondary key, the key server 400 may generate and combine the vehicle-sharing rights, i.e., a permission to use the secondary key, with the secondary key and transmit the combined vehicle-sharing rights to the users. Meanwhile, FIG. 1 shows the single key server 400 for convenience of explanation, however, the key server 400 may be configured as multiple servers for managing the digital key based on the mobile device for the vehicle-sharing.

Specifically, the key server 400 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Next, the vehicle-sharing server 500 may provide a vehicle-sharing service, and may include a memory for storing instructions for the vehicle-sharing, and a processor for performing processes of the vehicle-sharing, corresponding to the instructions in the memory.

Specifically, the vehicle-sharing server 500 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Meanwhile, the vehicle-sharing server 500 is described as configured as multiple servers, however, as another example, the vehicle-sharing server 500 may be configured as a single system including the key server 400, and may be configured to perform operations for managing the keys and operations for the vehicle-sharing with application software for performing each of the operations.

A method for managing the digital key based on the mobile device for the vehicle-sharing configured as such in accordance with one example of the present disclosure is described by referring to FIGS. 2 to 5.

Figure 2:
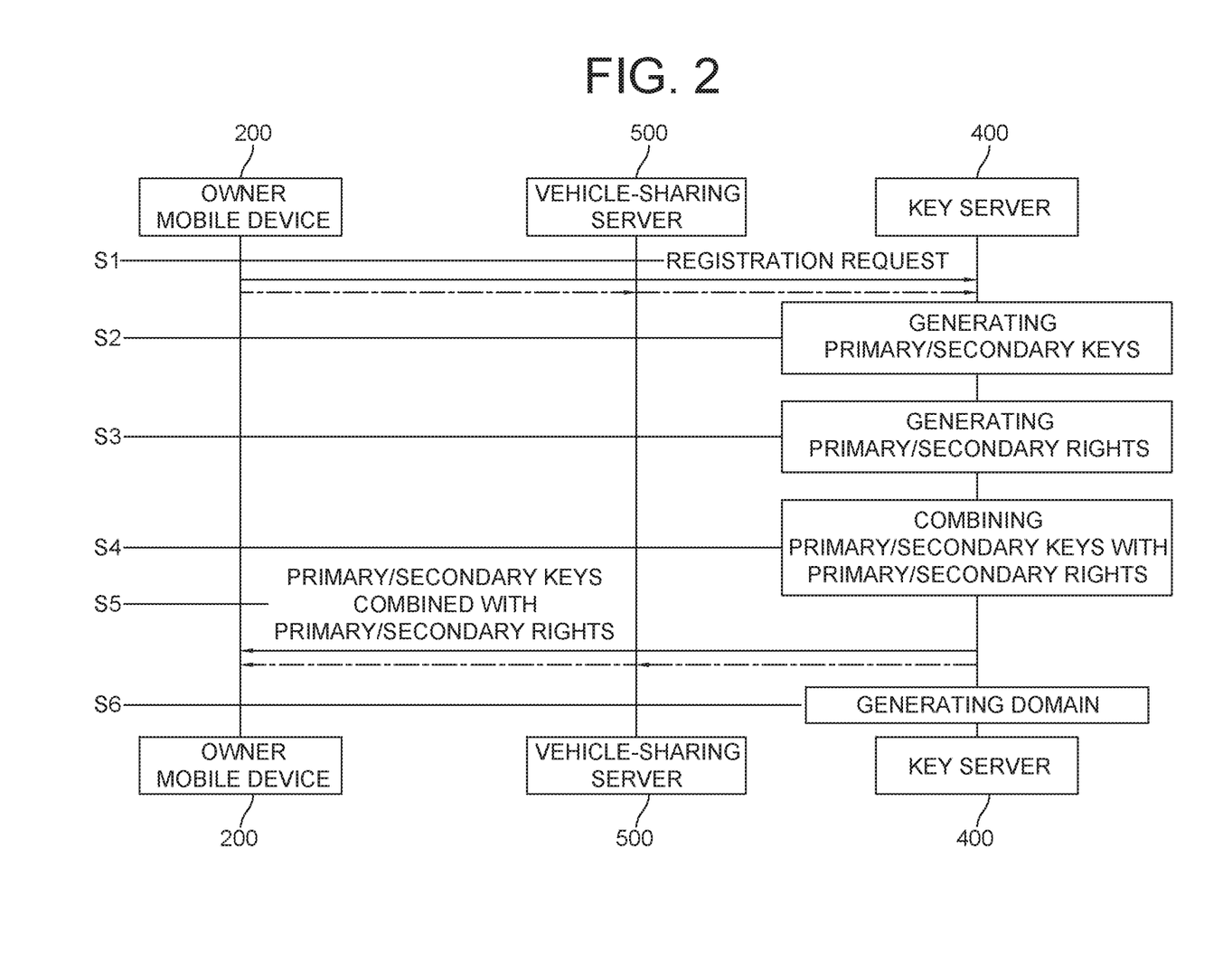
FIG. 2 is a drawing schematically illustrating a process of generating the digital key based on the mobile device according to a registration of a vehicle in accordance with one example embodiment of the present disclosure.

First, by referring to FIG. 2, a process of generating the digital key based on the mobile device according to the registration of the vehicle in accordance with one example embodiment of the present disclosure is described as follows.

To receive the digital key based on the mobile device by registering the vehicle 100, the owner of the vehicle 100 may input vehicle information and owner information and transmit the registration request for the registration of the vehicle at a step of S1, by way of the app installed on the owner mobile device 200 of the owner.

Herein, the vehicle information may include a registration number of the vehicle, a model of the vehicle, a date of manufacture of the vehicle, specification information on the vehicle, manufacturer information on the vehicle, vehicle identification number (VIN) of the vehicle, etc., but the scope of the present disclosure is not limited thereto, and may include any information capable of identifying the vehicle 100. And, the owner information may include personal information on the owner, a phone number corresponding to the owner mobile device 200, information on information-receiving means of the owner, etc., but the scope of the present disclosure is not limited thereto, and may include any information related to the owner. Herein, the information on the information-receiving means may include a phone number for receiving an SMS, information on an e-mail address, information on an SNS account, etc., but the scope of the present disclosure is not limited thereto, and may include various information on means of receiving information.

And, if the registration request for the vehicle 100 is acquired from the owner mobile device 200, the key server 400 may generate the primary key and the secondary key to be used for controlling the vehicle at a step of S2.

Herein, the key server 400 may receive the registration request for the vehicle from the owner mobile device 200, however, as another example, the key server 400 may receive the registration request for the vehicle by way of the vehicle-sharing server 500 which provides the vehicle-sharing service. That is, on condition that the owner of the vehicle has subscribed to the vehicle-sharing service, the owner of the vehicle may transmit the registration request for the registration of the vehicle using the vehicle-sharing service, by way of the owner mobile device 200, to thereby allow the vehicle-sharing server 500 to transmit the registration request for the registration of the vehicle 100 to the key server 400.

Also, in response to the registration request for the vehicle, the key server 400 may generate the primary key and the secondary key to be used for controlling the vehicle, and then generate the primary rights, including a range of control over the vehicle 100, corresponding to the primary key and generate the secondary rights, including a range of control over the vehicle 100, corresponding to the secondary key, at a step of S3. Herein, the range of control over the vehicle corresponding to a digital key may mean a range of control over the vehicle permitted according to the digital key.

Herein, the primary rights and the secondary rights may be certificates of the control over the vehicle 100 permitted according to the primary key and the secondary key, and CRL (certificate revocation list), OCSP (online certificate status protocol), OCSP stapling sampling, etc. may be used for managing the certificates in secure communications using SSL (secure sockets layer)/TLS (transport layer security) protocol. That is, the certificates have expiration dates used for maintaining integrity of the certificates which are continuously generated, revoked, renewed, etc., and the integrity of the certificates may be verified by using the CRL, by checking statuses of the certificates in real-time using the OCSP, or by way of the OCSP stapling in which a web server providing a service relays whether the certificates are expired via communication with an OCSP server, not by a client directly confirming whether the certificates are expired via the OCSP.

Meanwhile, the primary rights and the secondary rights are usage permission of control over the vehicle 100 respectively using the primary key and the secondary key, that is, a specified usage period, a specified usage count, etc., and for example, the vehicle may be set as usable for three days or set as usable five times. Also, the primary rights and the secondary rights may be set as a range of control of a specific operative status of the vehicle such as controlling doors, controlling a start of an engine, etc. Herein, since the primary rights and the secondary rights are the usage permission to use the primary key and the secondary key owned by the owner of the vehicle 100, the usage permission may be set as unlimited for the owner of the vehicle to perform every operation of the vehicle 100 by using the primary key or the secondary key.

Also, the key server 400 may include a signature value of the key server 400 in the primary rights and the secondary rights, and may verify the primary rights and the secondary rights by using the signature value of the key server 400.

Thereafter, the key server 400 may combine the primary rights with the primary key and may combine the secondary rights with the secondary key at a step of S4.

And, the key server 400 may transmit the primary key combined with the primary rights and the secondary key combined with the secondary rights to the owner mobile device 200 at a step of S5. Then, the owner mobile device 200 may store the primary key combined with the primary rights and the secondary key combined with the secondary rights in the Secure Element (SE).

Herein, the key server 400 may transmit the primary key combined with the primary rights and the secondary key combined with the secondary rights to information-receiving means corresponding to the owner information on the owner of the vehicle, to thereby allow the owner of the vehicle to confirm the primary key combined with the primary rights and the secondary key combined with the secondary rights received by the information-receiving means, and store the primary key combined with the primary rights and the secondary key combined with the secondary rights in the owner mobile device 200.

Meanwhile, the key server 400 is described above as directly transmitting the primary key combined with the primary rights and the secondary key combined with the secondary rights to the owner mobile device 200, however, as another example, the primary key combined with the primary rights and the secondary key combined with the secondary rights may be relayed to the owner mobile device 200 by way of the vehicle-sharing server 500.

And, the key server 400 may set the vehicle 100 and the owner mobile device 200 as a domain of the vehicle at a step of S6.

Herein, the domain of the vehicle may be used to control the rights and key usage, e.g., use of the key, a use count of the key, etc., of the vehicle 100 which is offline, may allow an access of the owner or another user to the vehicle, and may manage usage history of the vehicle.

Under this circumstance, if the owner performs the operation for using the primary key or the secondary key registered in the owner mobile device 200 in order to use the vehicle 100, the owner mobile device 200, i.e., the app installed on the owner mobile device 200, may transmit a verification request for the primary rights or the secondary rights to the key server 400, and if the key server 400 verifies the primary rights or the secondary rights, the control of the vehicle 100 using the primary key or the secondary key via NFC/BLE communication with the vehicle 100 may be allowed.

Figure 3:
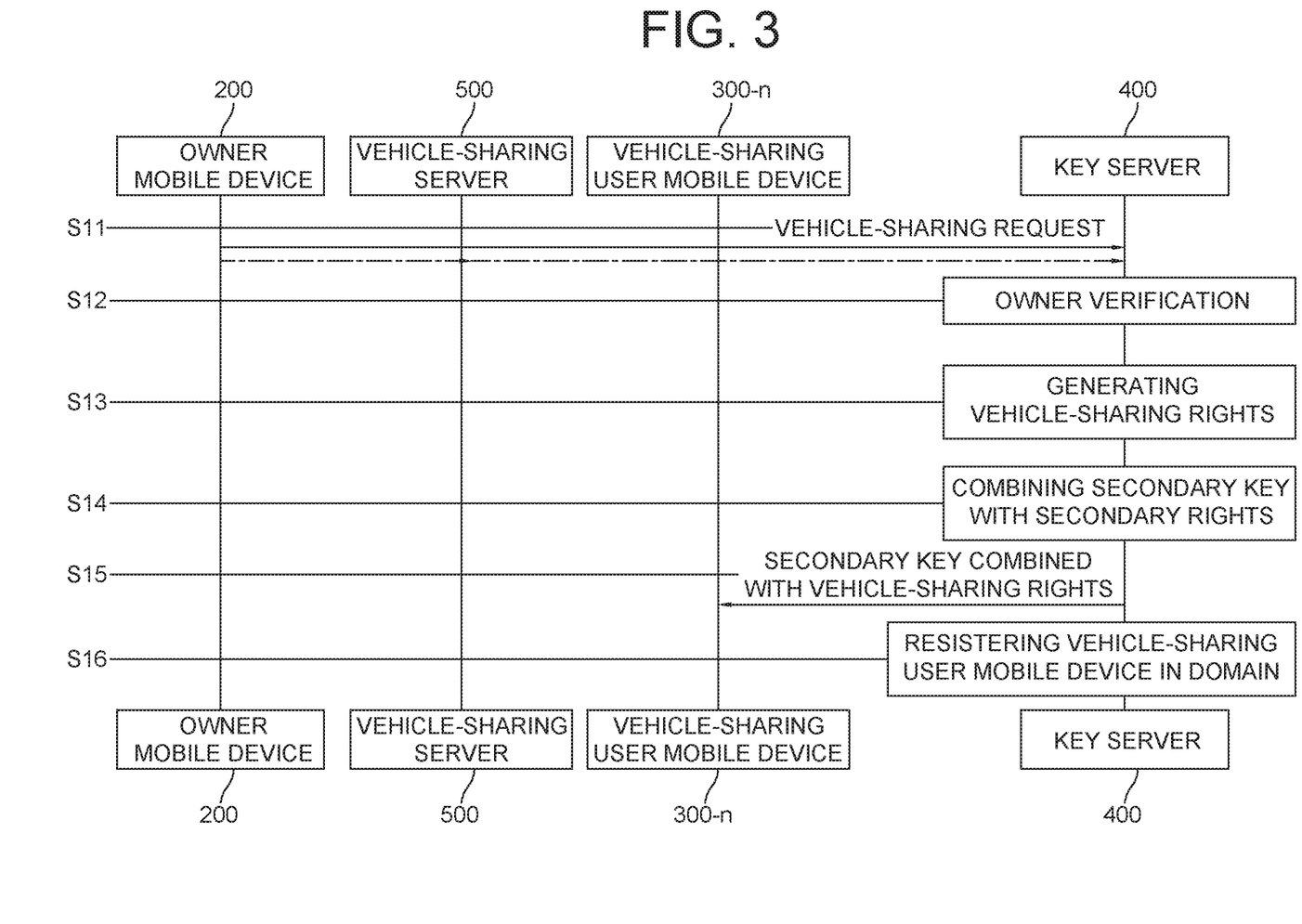
FIG. 3 is a drawing schematically illustrating a process of providing the digital key based on the mobile device for the vehicle-sharing in accordance with one example embodiment of the present disclosure.

Next, by referring to FIG. 3, a process of providing the digital key based on the mobile device for the vehicle-sharing in accordance with one example embodiment of the present disclosure is described as follows.

At least one vehicle-sharing request for the vehicle 100 may be transmitted from a 1-st to an n-th vehicle-sharing users to the key server 400, or the owner of the vehicle 100 may transmit the vehicle-sharing request to the key server 400 by using the owner mobile device 200 to allow the vehicle 100 to be shared by the 1-st to the n-th vehicle-sharing users, at a step of S11. Throughout the present disclosure, the 1-st to the n-th vehicle-sharing users may be referred to as the users for convenience of explanation, and vice versa, as the case may be. As another example, the vehicle-sharing server 500 providing the vehicle-sharing service may transmit the vehicle-sharing request to the key server 400 as instructed by the 1-st to the n-th vehicle-sharing users or the owner, at a step of S11.

Herein, the vehicle-sharing request may include at least one of the owner information, the primary key, the secondary key, the primary rights, and the secondary rights, but the scope of the present disclosure is not limited thereto, and may include various information to be used for verifying the owner of the vehicle 100. Also, the vehicle-sharing request may include information on the 1-st to the n-th vehicle-sharing users who have requested the vehicle-sharing, and the information on the vehicle-sharing users may include (i) identification information on the vehicle-sharing users, (ii) information on the user mobile devices of the vehicle-sharing users, and (iii) information on the information-receiving means of the vehicle-sharing users. Herein, the information on the information-receiving means of the vehicle-sharing users may include phone numbers of the vehicle-sharing users for receiving SMSs, information on e-mail addresses, information on SNS accounts, etc., but the scope of the present disclosure is not limited thereto, and may include various information of the vehicle-sharing users on means of receiving information. In addition to this, the vehicle-sharing request may include a 1-st to an n-th pieces of vehicle-sharing configuration information respectively corresponding to the 1-st to the n-th vehicle-sharing users, where each piece of the vehicle-sharing configuration information may include information on a range of control by each of the vehicle-sharing users over the vehicle 100. Herein, the vehicle-sharing configuration information may be the usage permission of control by the vehicle-sharing users over the vehicle 100, that is, the specified usage period, the specified usage count, etc., set by the owner mobile device 200 corresponding to the owner of the vehicle 100 or by the vehicle-sharing server 500, and for example, the vehicle may be set as usable for three days or set as usable five times. Also, the vehicle-sharing configuration information may be set as a range of control of the specific operative status of the vehicle such as controlling the doors, controlling the start of the engine, etc.

And, if the vehicle-sharing request is acquired from the owner mobile device 200 or the vehicle-sharing server 500, the key server 400 may perform owner verification for confirming whether the vehicle-sharing request is from the owner of the vehicle 100 at a step of S12. Herein, the owner verification may be performed by using at least one of the owner information, the primary key, the secondary key, the primary rights, and the secondary rights included in the vehicle-sharing request. As one example, when using the owner information, the primary key, the secondary key, etc., the owner mobile device 200 corresponding to the owner information, the primary key, or the secondary key may be challenged for the owner verification. Also, when using the primary rights or the secondary rights, the owner verification may be performed by determining a validity of the primary rights or the secondary rights by using the signature value of the key server 400, etc. included in the primary rights or the secondary rights.

Thereafter, the key server 400 may generate the 1-st to the n-th vehicle-sharing rights, including ranges of control over the vehicle 100 by the secondary key, corresponding to each of the 1-st to the n-th vehicle-sharing users by referring to the 1-st to the n-th pieces of the vehicle-sharing configuration information at a step of S13.

Then, the key server 400 may combine each of the 1-st to the n-th vehicle-sharing rights with the secondary key at a step of S14, to thereby transmit each of the combined 1-st to the n-th vehicle-sharing rights to its corresponding information-receiving means of the 1-st to the n-th vehicle-sharing users at a step of S15. Then, each of the 1-st to the n-th vehicle-sharing users may store the secondary key combined with the vehicle-sharing rights, transmitted to the information-receiving means, in each of the user mobile devices 300-1, 300-2, . . . , and 300-n, e.g., in the Secure Element (SE), to thereby allow the vehicle 100 to be shared by using the secondary key according to the vehicle-sharing rights.

Also, the key server 400 may register the 1-st to the n-th user mobile devices 300-1, 300-2, . . . , and 300-n provided with the vehicle-sharing rights in the domain of the vehicle 100 at a step of S16.

Meanwhile, the 1-st to the n-th vehicle-sharing rights are described above as combined with the secondary key and transmitted in response to the vehicle-sharing request, however, only the vehicle-sharing rights may be transmitted, without the secondary key, to the users who already have the secondary key acquired from a previous vehicle-sharing.

As one example, the key server 400 may confirm whether history of the sharing of the vehicle 100 by the 1-st to the n-th vehicle-sharing users is present by referring to the domain in response to the vehicle-sharing request, and may transmit only specific vehicle-sharing rights to the information-receiving means of a specific vehicle-sharing user among the 1-st to the n-th vehicle-sharing users without combining the specific vehicle-sharing rights with the secondary key related to the specific user who has the history of sharing the vehicle 100, to thereby allow the vehicle 100 to be shared by using the secondary key already registered according to validity of the specific vehicle-sharing rights by registering the specific vehicle-sharing rights only in a specific user mobile device of the specific vehicle-sharing user who already has the secondary key. Throughout the present disclosure, the specific vehicle-sharing user may be referred to as the specific user for convenience of explanation, and vice versa, as the case may be. As a result, unlike conventional repeated generation of the digital key, the cost of generation of the digital key is reduced and management of the generated digital key is simplified, by allowing the vehicle-sharing with the vehicle-sharing rights corresponding to the secondary key.

Also, for providing the vehicle-sharing service, if each digital key of the manufacturers of vehicles has each different configuration, then conventionally, each locked-in app and each specific module must be used, however, in accordance with the present disclosure, a single app may be used to provide the same vehicle-sharing service to the vehicles of different manufacturers by way of the method of distributing the digital key, i.e., the secondary key, and the vehicle-sharing rights through user verification. In addition to this, when a solution of a third party such as TEE (Trusted Execution Environment) is used for specialized security, conventionally, compatibility could not be guaranteed due to the app store update, the OS update, and characteristics of device manufacturers, however, in accordance with the present disclosure, even if the digital key, i.e., the secondary key, for controlling the vehicle is stolen due to a failure in storing in a specific area, the user mobile devices 300-1, 300-2, . . . , and 300-n, i.e., the apps on the user mobile devices, may be blocked to prevent a vehicle-sharing user, whose usage permission is not authorized according to the vehicle-sharing rights, from sharing the vehicle.

Under the circumstance that the secondary key for the vehicle-sharing and its corresponding vehicle-sharing rights have been provided as such, a process of sharing the vehicle by the users is described as follows.

If a usage request of the secondary key for controlling the vehicle 100 is acquired from a specific user mobile device 300-$k$ registered in the domain where 1≤k≤n, the key server 400 may verify specific vehicle-sharing rights included in the usage request.

And, if the specific vehicle-sharing rights are determined as valid, the key server 400 may allow the secondary key to be used by the specific user mobile device 300-$k$, to thereby allow the specific user mobile device 300-$k$ to control the vehicle 100 according to the specific vehicle-sharing rights by using the secondary key.

Herein, the specific user mobile device 300-$k$ may control the vehicle 100 by using the secondary key via NFC/BLE communication with the vehicle 100.

And, if the sharing of the vehicle 100 using the specific user mobile device 300-$k$ is terminated, the key server 400 may perform billing for the vehicle-sharing.

Also, the key server 400 may register information on a time and a place of termination of the vehicle-sharing in the domain by referring to location information on the specific user mobile device 300-$k$. As a result, the owner of the vehicle 100 and another user may access the place of the vehicle 100 and a vehicle-sharing status of the vehicle 100.

In addition to this, if one or more transactions for controlling the vehicle 100 using the secondary key are acquired from at least one specific user mobile device 300-$k$ among the 1-st to the n-th user mobile devices 300-1, 300-2, . . . , and 300-$n$ registered in the domain where 1≤k≤n, the key server 400 may manage usage information on the secondary key by referring to the transactions, and may confirm whether the control over the vehicle 100 according to the transactions is within a range of the specific vehicle-sharing rights provided to the specific user corresponding to the specific user mobile device.

Also, if the signature value of the key server 400 of the specific vehicle-sharing rights is determined as forged, the key server 400 may allow the specific vehicle-sharing rights to expire, and remove the specific user mobile device 300-$k$ corresponding to the specific vehicle-sharing rights from the domain, to thereby prevent the specific user from sharing the vehicle 100 using the secondary key.

Figure 4:
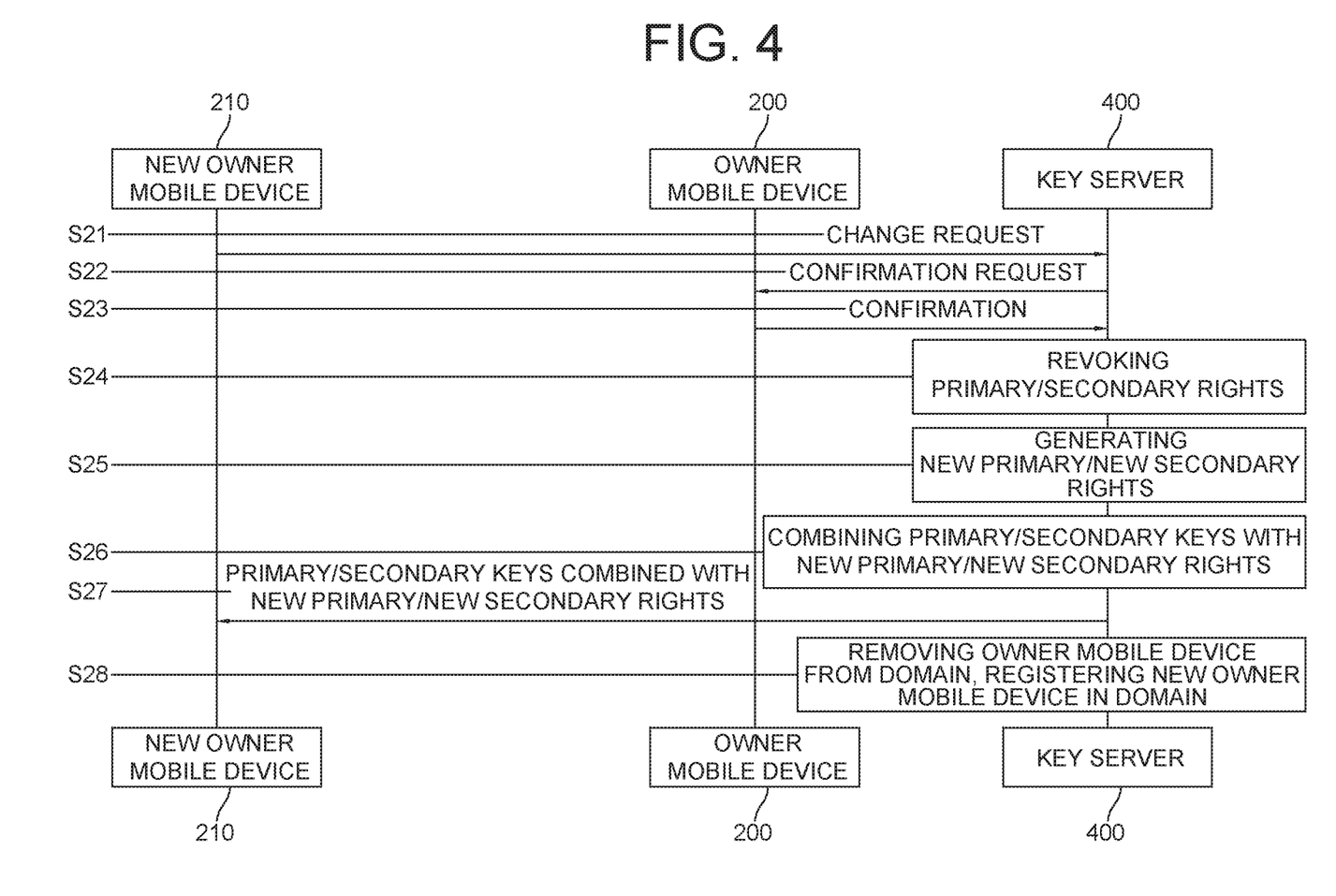
FIG. 4 is a drawing schematically illustrating a process of transferring the digital key based on the mobile device according to a change of an ownership of the vehicle in accordance with one example embodiment of the present disclosure.

Next, by referring to FIG. 4, a process of transferring the digital key based on the mobile device according to a change of an ownership of the vehicle in accordance with one example embodiment of the present disclosure is described as follows.

A new owner to whom the ownership of the vehicle 100 is transferred according to the change of the ownership by a sell or buy of the vehicle 100 may transmit a change request for the primary key and the secondary key by using a new owner mobile device 210 at a step of S31.

Herein, the change request may include the vehicle information on the vehicle 100 whose ownership is to be changed and the owner information on the new owner. And, the vehicle information may include the registration number of the vehicle, the model of the vehicle, the date of manufacture of the vehicle, the specification information on the vehicle, the manufacturer information on the vehicle, the vehicle identification number (VIN) of the vehicle, etc., but the scope of the present disclosure is not limited thereto, and may include any information capable of identifying the vehicle 100. Also, the owner information on the new owner may include the personal information on the new owner, the phone number corresponding to the new owner mobile device 210, information on the information-receiving means of the new owner, etc., but the scope of the present disclosure is not limited thereto, and may include the any information related to the new owner. Herein, the information on the information-receiving means may include a phone number for receiving SMSs, information on an e-mail address, information on an SNS account, etc., but the scope of the present disclosure is not limited thereto, and may include various information on means of receiving information.

Then, in response to the change request for the primary key and the secondary key from the new owner mobile device 210 at a step of S21, the key server 400 may transmit a confirmation request, corresponding to the change request, to the owner mobile device 200, to thereby allow the owner to confirm whether the change request of the ownership of the vehicle 100 is valid.

And, if a confirmation of the change request is acquired from the owner mobile device 200 at a step of S23, the key server 400 may revoke the primary rights and the secondary rights respectively corresponding to the primary key and the secondary key at a step of S24.

Thereafter, the key server 400 may generate new primary rights including a range of control over the vehicle corresponding to the primary key and generate new secondary rights including a range of control over the vehicle corresponding to the secondary key at a step of S25, and may combine the new primary rights with the primary key and combine the new secondary rights with the secondary key at a step of S26.

And, the key server 400 may transmit the primary key combined with the new primary rights and the secondary key combined with the new secondary rights to the new owner mobile device 210 at a step of S27, to thereby allow the new owner to control the vehicle 100 by using the primary key or the secondary key.

Also, the key server 400 may register the new owner mobile device 210 in the domain, and may remove the owner mobile device 200 from the domain at a step of S28.

As one example, as mentioned above, according to the change of the ownership of the vehicle 100, (i) the primary rights corresponding to the primary key and the secondary rights corresponding to the secondary key are revoked without revoking the primary key and the secondary key, (ii) the new primary rights corresponding to the primary key and the new secondary rights corresponding to the secondary key are generated, and (iii) the new owner is allowed to use the primary key and the secondary key which are already generated.

However, as another example, (i) the primary key and the secondary key may also be revoked, (ii) a new primary key and a new secondary key may be generated, (iii) the new primary rights corresponding to the new primary key and the new secondary rights corresponding to the new secondary key may be generated, and (iv) the new primary key combined with the new primary rights and the new secondary key combined with the new secondary rights may be transmitted to the new owner mobile device 210, to thereby allow the new owner to control the vehicle 100 by using the new primary key or the new secondary key.

Figure 5:
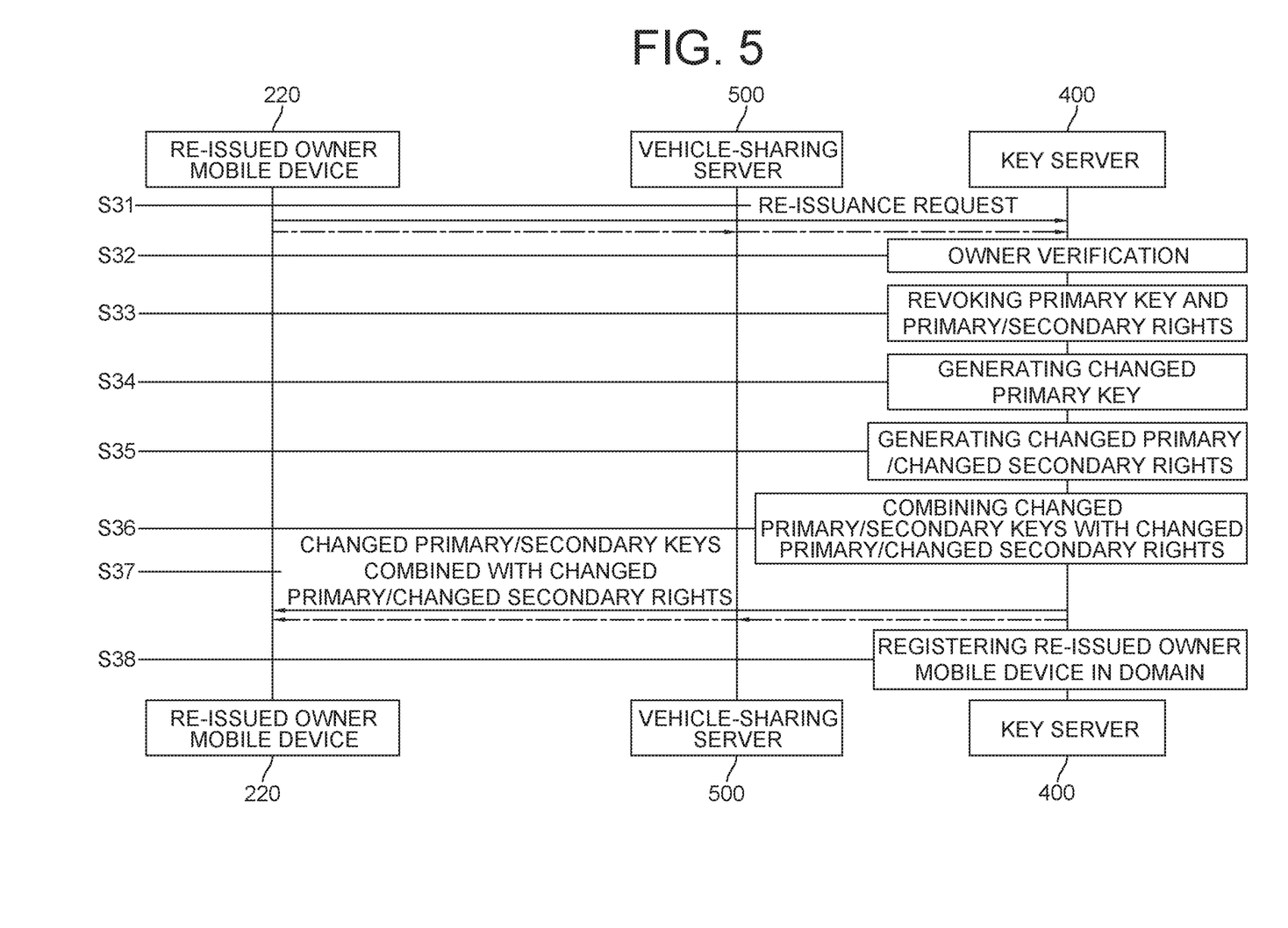
FIG. 5 is a drawing schematically illustrating a process of re-issuing the digital key based on the mobile device in accordance with one example embodiment of the present disclosure.

Next, by referring to FIG. 5, a process of re-issuing the digital key based on the mobile device in accordance with one example embodiment of the present disclosure is described as follows.

In response to (i) leakage of the primary key and the secondary key owned by the owner of the vehicle 100 or (ii) possible leakage of the primary key and the secondary key caused by loss of the owner mobile device, the owner of the vehicle 100 may transmit a re-issuance request for the primary key and the secondary key at a step of S31.

Herein, the owner may transmit the re-issuance request for the primary key and the secondary key while connected to the key server 400 by using a computing device, the owner mobile device 200, or a re-issued owner mobile device 220 which is changed from the owner mobile device 200. Throughout the present disclosure, the re-issued owner mobile device may be referred to as an owner's additional mobile device for convenience of explanation, and vice versa, as the case may be. And, the re-issuance request may include changed information on the owner or information on the owner's additional mobile device 220.

Then, the key server 400 may perform the owner verification for confirming whether the re-issuance request is from the owner of the vehicle 100 at a step of S32. Herein, the key server 400 may challenge the owner's additional mobile device 220 for the owner verification, but the scope of the present disclosure is not limited thereto, and various methods for the owner verification may be performed.

Thereafter, if the re-issuance request is determined as originating from the owner of the vehicle via the owner verification, the key server 400 may revoke the primary key, the primary rights, and the secondary rights at a step of S33.

And, the key server 400 may generate a changed primary key for controlling the vehicle at a step of S34, and may generate changed primary rights including a range of control over the vehicle corresponding to the changed primary key and generate changed secondary rights including a range of control over the vehicle corresponding to the secondary key at a step of S35.

Thereafter, the key server 400 may combine the changed primary rights with the changed primary key and combine the changed secondary rights with the secondary key at a step of S36, and may transmit the changed primary key combined with the changed primary rights and the secondary key combined with the changed secondary rights to the information-receiving means of the owner at a step of S37.

Accordingly, the owner of the vehicle 100 may register the changed primary key combined with the changed primary rights and the secondary key combined with the changed secondary rights, received via the information-receiving means, in the owner's additional mobile device 220, to thereby control the vehicle 100 by using the changed primary key or the secondary key.

Herein, the secondary key may be conserved without being revoked, so that the vehicle-sharing users who are allowed to share the vehicle by using the secondary key may keep sharing the vehicle.

And, if the owner mobile device of the owner of the vehicle is changed in response to the re-issuance request, the key server 400 may register the owner's additional mobile device 220 in the domain at a step of S38, and may remove a previous owner mobile device 200 from the domain.

Meanwhile, in the above description, in response to the re-issuance request for the primary key and the secondary key of the owner, the primary key is revoked and the changed primary key is generated, however, as another example, the changed primary rights and the changed secondary rights respectively corresponding to the primary key and the secondary key may be issued without revoking the primary key.

That is, if the re-issuance request for the primary key and the secondary key is acquired from the owner of the vehicle, the key server 400 may perform or support another device to perform processes of (i) verifying whether the owner who has transmitted the re-issuance request is a real owner of the vehicle, (ii) revoking the primary rights and the secondary rights generated as corresponding to the the owner of the vehicle, (iii) generating the changed primary rights including a range of control over the vehicle corresponding to the primary key and generating the changed secondary rights including a range of control over the vehicle corresponding to the secondary key, (iv) combining the changed primary rights with the primary key and combining the changed secondary rights with the secondary key, and (v) transmitting the primary key combined with the changed primary rights and the secondary key combined with the changed secondary rights to the information-receiving means of the owner.

Also, under the circumstance of sharing the vehicle according to the processes described by referring to FIGS. 2 to 5, the key server 400 may perform or support another device to perform processes of (i) confirming the 1-st to the n-th vehicle-sharing rights by communicating with the 1-st to the n-th user mobile devices 300-1, 300-2, . . . , and 300-$n$, to thereby allow at least part of the vehicle-sharing rights to expire whose effective dates are lapsed, or verifying the 1-st to the n-th vehicle-sharing rights, to thereby allow at least part of the 1-st to the n-th vehicle-sharing rights to expire which are determined as forged, and (ii) recording information on the expired vehicle-sharing rights as corresponding to information on the secondary key.

In addition to this, if the 1-st to the n-th vehicle-sharing users terminate the vehicle-sharing service or uninstall the app for the vehicle-sharing installed on the 1-st to the n-th user mobile devices 300-1, 300-2, . . . , and 300-$n$, the key server 400 may remove the user mobile devices, of the vehicle-sharing users who uninstalled the vehicle-sharing app or terminated the vehicle-sharing service, among the 1-st to the n-th user mobile devices 300-1, 300-2, . . . , and 300-$n$ from the domain, to thereby block the vehicle 100 from being shared but may keep the history of the secondary key in the domain.

The present disclosure has an effect of eliminating the need for generation of the additional digital key for the vehicle-sharing by separating the generation and the usage permission of the digital key based on the mobile device for the vehicle-sharing, simplifying costs and procedures of the generation of the digital key, and improving convenience of management of the vehicle-sharing service.

The present disclosure has another effect of preventing a replay attack which uses random digital keys, by separating the generation and the usage permission of the digital key based on the mobile device for the vehicle-sharing.

The present disclosure has still another effect of preventing illegal use of the vehicle using a leaked digital key, by separating the generation and the usage permission of the digital key based on the mobile device for the vehicle-sharing.

The present disclosure has still yet another effect of performing the vehicle-sharing independent of the app store update on the app for the vehicle-sharing and the operation system update, since the vehicle-sharing is performed by using the usage permission of the digital key, by separating the generation and the usage permission of the digital key based on the mobile device for the vehicle-sharing.

The present disclosure has still yet another effect of easily managing the sharing history of the vehicle by performing the vehicle-sharing using a single digital key for the vehicle-sharing.

The embodiments of the present disclosure as explained above can be implemented in a form of executable program command through a variety of computer means recordable in computer readable media. The computer readable media may include solely or in combination, program commands, data files, and data structures. The program commands recorded in the media may be components specially designed for the present disclosure or may be usable to those skilled in the art in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as one or more software modules to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for managing at least one digital key of at least one mobile device to be used for vehicle-sharing, comprising steps of:
   (a) when a registration request for registration of a vehicle, including vehicle information and owner information, is acquired from an owner mobile device of an owner of the vehicle by a key server, the key server performing the steps of:
      (i) generating a primary key and a secondary key to be used for controlling the vehicle, (ii) generating primary rights, including a range of control over the vehicle by the primary key and generating secondary rights, including a range of control over the vehicle by the secondary key, (iii) combining the primary rights with the primary key and combining the secondary rights with the secondary key, (iv) transmitting the primary key combined with the primary rights and the secondary key combined with the secondary rights to the owner mobile device, and (v) setting the vehicle and the owner mobile device as a domain of the vehicle; and (b) when a vehicle-sharing request including:

(i) at least one of the owner information, the primary key, the secondary key, the primary rights, and the secondary rights, (ii) information on one or more vehicle-sharing users who have requested vehicle-sharing, including (ii-1) identification information on the one or more vehicle-sharing users, (ii-2) information on one or more user mobile devices, each corresponding to at least one of the one or more vehicle-sharing users, and (ii-3) information on information-receiving means of the one or more vehicle-sharing users, and (iii) one or more pieces of vehicle-sharing configuration information each respectively corresponding to at least one of the one or more vehicle-sharing users wherein each piece of the vehicle-sharing configuration information includes information on a range of control by each of the vehicle-sharing users over the vehicle, is acquired from the owner mobile device or a vehicle-sharing server by the key server, the key server performing the steps of:

(1) generating one or more vehicle-sharing rights, including ranges of control over the vehicle by the secondary key, each corresponding to each of the one or more vehicle-sharing users by referring to the one or more pieces of the vehicle-sharing configuration information, (2) combining each of the one or more vehicle-sharing rights with the secondary key, to thereby transmit each of the combined one or more vehicle-sharing rights to its corresponding information-receiving means of the one or more vehicle-sharing users, and (3) registering the one or more user mobile devices in the domain.

2. The method of claim 1, wherein the method further comprises a step of:

(c) when a usage request for using the secondary key to control the vehicle is acquired from a specific user mobile device among the one or more user mobile devices registered in the domain by the key server, the key server: (i) verifying specific vehicle-sharing rights included in the usage request, (ii) transmitting, when the specific vehicle-sharing rights are determined as valid, a permission to use the secondary key to the specific user mobile device, to thereby allow the specific user mobile device to control the vehicle according to the specific vehicle-sharing rights by using the secondary key, (iii) billing, when vehicle-sharing of the vehicle using the specific user mobile device is terminated, for the vehicle-sharing, and (iv) registering information on a time and a place of termination of the vehicle-sharing using the specific user mobile device, in the domain by referring to location information on the specific user mobile device, to thereby allow the owner and another vehicle-sharing user to access the place and a vehicle-sharing status of the vehicle.

3. The method of claim 1, wherein the method further comprises a step of:

(d) when one or more transactions for controlling the vehicle using the secondary key are acquired from a specific user mobile device among the one or more user mobile devices registered in the domain by the key server, the key server managing usage information on the secondary key by referring to the transactions, and confirming whether the control over the vehicle according to the transactions is within a range of specific vehicle-sharing rights provided to a specific vehicle-sharing user corresponding to the specific user mobile device.

4. The method of claim 1, wherein, after the step of (a), the method further comprises a step of:

(e) (i) when a change request for the primary key and the secondary key is acquired by the key server from a new owner mobile device of a new owner according to change of an ownership of the vehicle, the key server transmitting a confirmation request corresponding to the change request to the owner mobile device, to thereby allow the owner to confirm whether the change request is valid, and (ii) when the confirmation of the change request is acquired from the owner mobile device, the key server: (ii-1) revoking the primary rights and the secondary rights respectively corresponding to the primary key and the secondary key, (ii-2) generating new primary rights including a range of control over the vehicle by the primary key and generating new secondary rights including a range of control over the vehicle by the secondary key, (ii-3) combining the new primary rights with the primary key and combining the new secondary rights with the secondary key, (ii-4) transmitting the primary key combined with the new primary rights and the secondary key combined with the new secondary rights to the new owner mobile device, and (ii-5) registering the new owner mobile device in the domain and removing the owner mobile device registered in the domain.

5. The method of claim 1, wherein the method further comprises a step of:

(f) the key server (i) confirming the one or more vehicle-sharing rights by communicating with the one or more user mobile devices, to thereby allow at least part of the vehicle-sharing rights to expire whose effective dates are lapsed, or verifying the one or more vehicle-sharing rights, to thereby allow at least part of the one or more vehicle-sharing rights to expire which are determined as forged, and (ii) recording information on the expired vehicle-sharing rights as corresponding to information on the secondary key.

6. The method of claim 1, wherein, at the step of (b), the key server confirms whether history of sharing the vehicle by the one or more vehicle-sharing users is present by referring to the domain in response to the vehicle-sharing request, and transmits only specific vehicle-sharing rights to the information-receiving means of a specific vehicle-sharing user among the one or more vehicle-sharing users without combining the specific vehicle-sharing rights with the secondary key related to the specific vehicle-sharing user who has the history of sharing the vehicle.

7. The method of claim 1, wherein, after the step of (a), the method further comprises a step of:

(g) when a re-issuance request for the primary key and the secondary key is acquired from the owner by the key server, the key server (i) verifying whether the owner is a real owner of the vehicle, (ii) revoking the primary key, the primary rights, and the secondary rights generated at the step of (a), (iii) generating a changed primary key to be used for controlling the vehicle, (iv) generating changed primary rights including a range of control over the vehicle by the changed primary key and generating changed secondary rights including a range of control over the vehicle by the secondary key, (v) combining the changed primary rights with the changed primary key and combining the changed secondary rights with the secondary key, and (vi) transmitting the changed primary key combined with the changed primary rights and the secondary key combined with the changed secondary rights to the information-receiving means of the owner.

8. The method of claim 1, wherein, after the step of (a), the method further comprises a step of:

(h) when a re-issuance request for the primary key and the secondary key is acquired from the owner by the key server, the key server (i) verifying whether the owner is a real owner of the vehicle, (ii) revoking the primary rights and the secondary rights generated at the step of (a), (iii) generating changed primary rights including a range of control over the vehicle by the primary key and generating changed secondary rights including a range of control over the vehicle by the secondary key, (iv) combining the changed primary rights with the primary key and combining the changed secondary rights with the secondary key, and (v) transmitting the primary key combined with the changed primary rights and the secondary key combined with the changed secondary rights to the information-receiving means of the owner.

9. The method of claim 1, wherein the primary rights, the secondary rights, and the one or more vehicle-sharing rights respectively include a signature value of the key server.

10. The method of claim 1, wherein the primary rights, the secondary rights, and the one or more vehicle-sharing rights are respectively certificates corresponding to an online certificate status protocol (OCSP).

11. A key server for managing at least one digital key of at least one mobile device to be used for vehicle-sharing, comprising:

at least one memory that stores instructions; and
at least one processor configured to execute the instructions to perform or support another device to perform processes of:

(I) when a registration request for registration of a vehicle, including vehicle information and owner information, is acquired from an owner mobile device of an owner of the vehicle,
  (i) generating a primary key and a secondary key to be used for controlling the vehicle,
  (ii) generating primary rights, including a range of control over the vehicle by the primary key and generating secondary rights, including a range of control over the vehicle by the secondary key,
  (iii) combining the primary rights with the primary key and combining the secondary rights with the secondary key,
  (iv) transmitting the primary key combined with the primary rights and the secondary key combined with the secondary rights to the owner mobile device, and
  (v) setting the vehicle and the owner mobile device as a domain of the vehicle, and (II) when a vehicle-sharing request including
  (i) at least one of the owner information, the primary key, the secondary key, the primary rights, and the secondary rights,
  (ii) information on a one or more vehicle-sharing users who have requested vehicle-sharing, including
    (ii-1) identification information on the one or more vehicle-sharing users,
    (ii-2) information on one or more user mobile devices, each corresponding to one of the one or more of vehicle-sharing users, and
    (ii-3) information on information-receiving means of the one or more vehicle-sharing users, and
  (iii) one or more pieces of vehicle-sharing configuration information each respectively corresponding to at least one of the one or more vehicle-sharing users wherein each piece of the vehicle-sharing configuration information includes information on a range of control by each of the vehicle-sharing users over the vehicle,
is acquired from the owner mobile device or a vehicle-sharing server by the processor,
  (1) generating one or more vehicle-sharing rights, including ranges of control over the vehicle by the secondary key, each corresponding to at least one of the one or more vehicle-sharing users by referring to the one or more pieces of the vehicle-sharing configuration information,
  (2) combining each of the one or more vehicle-sharing rights with the secondary key, to thereby transmit each of the combined one or more vehicle-sharing rights to its corresponding information-receiving means of the one or more vehicle-sharing users, and
  (3) registering the one or more user mobile devices in the domain.

12. The key server of claim 11, wherein the processor further performs a process of:

(III) when a usage request for using the secondary key to control the vehicle is acquired from a specific user mobile device among the one or more user mobile devices registered in the domain, (i) verifying specific vehicle-sharing rights included in the usage request, (ii) transmitting, when the specific vehicle-sharing rights are determined as valid, a permission to use the secondary key to the specific user mobile device, to thereby allow the specific user mobile device to control the vehicle according to the specific vehicle-sharing rights by using the secondary key, (iii) billing, when vehicle-sharing of the vehicle using the specific user mobile device is terminated, for the vehicle-sharing, and (iv) registering information on a time and a place of termination of the vehicle-sharing using the specific user mobile device, in the domain by referring to location information on the specific user mobile device, to thereby allow the owner and another vehicle-sharing user to access the place and a vehicle-sharing status of the vehicle.

13. The key server of claim 11, wherein the processor further performs a process of:

(IV) when one or more transactions for controlling the vehicle using the secondary key are acquired from a specific user mobile device among the one or more user mobile devices registered in the domain, managing usage information on the secondary key by referring to the transactions, and confirming whether the control over the vehicle according to the transactions is within a range of specific vehicle-sharing rights provided to a specific vehicle-sharing user corresponding to the specific user mobile device.

14. The key server of claim 11, wherein, after the process of (I), the processor further performs a process of:
(V) (i) when a change request for the primary key and the secondary key is acquired from a new owner mobile device of a new owner according to change of an ownership of the vehicle, transmitting a confirmation request corresponding to the change request to the owner mobile device, to thereby allow the owner to confirm whether the change request is valid, and (ii) when the confirmation of the change request is acquired from the owner mobile device, (ii-1) revoking the primary rights and the secondary rights respectively corresponding to the primary key and the secondary key, (ii-2) generating new primary rights including a range of control over the vehicle by the primary key and generating new secondary rights including a range of control over the vehicle by the secondary key, (ii-3) combining the new primary rights with the primary key and combining the new secondary rights with the secondary key, (ii-4) transmitting the primary key combined with the new primary rights and the secondary key combined with the new secondary rights to the new owner mobile device, and (ii-5) registering the new owner mobile device in the domain and removing the owner mobile device registered in the domain.

15. The key server of claim 11, wherein the processor further performs a process of:
(VI) (i) confirming the one or more vehicle-sharing rights by communicating with the one or more user mobile devices, to thereby allow at least part of the vehicle-sharing rights to expire whose effective dates are lapsed, or verifying the one or more vehicle-sharing rights, to thereby allow at least part of the one or more vehicle-sharing rights to expire which are determined as forged, and (ii) recording information on the expired vehicle-sharing rights as corresponding to information on the secondary key.

16. The key server of claim 11, wherein, at the process of (II), the processor confirms whether history of sharing the vehicle by the one or more vehicle-sharing users is present by referring to the domain in response to the vehicle-sharing request, and transmits only specific vehicle-sharing rights to the information-receiving means of a specific vehicle-sharing user among the one or more vehicle-sharing users without combining the specific vehicle-sharing rights with the secondary key related to the specific vehicle-sharing user who has the history of sharing the vehicle.

17. The key server of claim 11, wherein, after the process of (I), the processor further performs a process of:
(VII) when a re-issuance request for the primary key and the secondary key is acquired from the owner, (i) verifying whether the owner is a real owner of the vehicle, (ii) revoking the primary key, the primary rights, and the secondary rights generated at the process of (I), (iii) generating a changed primary key to be used for controlling the vehicle, (iv) generating changed primary rights including a range of control over the vehicle by the changed primary key and generating changed secondary rights including a range of control over the vehicle by the secondary key, (v) combining the changed primary rights with the changed primary key and combining the changed secondary rights with the secondary key, and (vi) transmitting the changed primary key combined with the changed primary rights and the secondary key combined with the changed secondary rights to the information-receiving means of the owner.

18. The key server of claim 11, wherein, after the process of (I), the processor further performs a process of:
(VIII) when a re-issuance request for the primary key and the secondary key is acquired from the owner, (i) verifying whether the owner is a real owner of the vehicle, (ii) revoking the primary rights and the secondary rights generated at the process of (I), (iii) generating changed primary rights including a range of control over the vehicle by the primary key and generating changed secondary rights including a range of control over the vehicle by the secondary key, (iv) combining the changed primary rights with the primary key and combining the changed secondary rights with the secondary key, and (v) transmitting the primary key combined with the changed primary rights and the secondary key combined with the changed secondary rights to the information-receiving means of the owner.

19. The key server of claim 11, wherein the primary rights, the secondary rights, and the one or more vehicle-sharing rights respectively include a signature value of the key server.

20. The key server of claim 11, wherein the primary rights, the secondary rights, and the one or more vehicle-sharing rights are respectively certificates corresponding to an online certificate status protocol (OCSP).

* * * * *